United States Patent
Vijayasankar et al.

(10) Patent No.: US 8,787,404 B2
(45) Date of Patent: Jul. 22, 2014

(54) EVENT-BASED KEEP ALIVE TIMES IN COMMUNICATION NETWORKS

(75) Inventors: Kumaran Vijayasankar, Dallas, TX (US); Ramanuja Vedantham, Allen, TX (US); Xiaolin Lu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 115 days.

(21) Appl. No.: 13/473,323

(22) Filed: May 16, 2012

(65) Prior Publication Data

US 2012/0300700 A1 Nov. 29, 2012

Related U.S. Application Data

(60) Provisional application No. 61/490,187, filed on May 26, 2011, provisional application No. 61/605,400, filed on Mar. 1, 2012.

(51) Int. Cl.
*H04J 3/16* (2006.01)

(52) U.S. Cl.
USPC ............ 370/468; 370/230; 370/235; 370/465

(58) Field of Classification Search
None
See application file for complete search history.

(56) References Cited

U.S. PATENT DOCUMENTS

| | | | |
|---|---|---|---|
| 5,155,726 A * | 10/1992 | Spinney et al. | 370/296 |
| 7,788,381 B2 | 8/2010 | Watson et al. | |
| 7,885,633 B2 * | 2/2011 | Schwager et al. | 455/402 |
| 2005/0185592 A1 * | 8/2005 | Idsinga | 370/241 |
| 2006/0087977 A1 | 4/2006 | Tatman | |
| 2007/0076505 A1 * | 4/2007 | Radtke et al. | 365/222 |
| 2008/0025258 A1 * | 1/2008 | Lefevre et al. | 370/330 |
| 2009/0271517 A1 | 10/2009 | Naylor et al. | |
| 2010/0088440 A1 | 4/2010 | Banks et al. | |
| 2010/0111199 A1 * | 5/2010 | Sharma | 375/257 |
| 2010/0322124 A1 | 12/2010 | Luoma et al. | |
| 2012/0008536 A1 | 1/2012 | Tervahauta et al. | |
| 2012/0246331 A1 * | 9/2012 | Heller et al. | 709/230 |

* cited by examiner

*Primary Examiner* — Donald Mills
(74) *Attorney, Agent, or Firm* — Steven A. Shaw; Frederick J. Telecky, Jr.

(57) ABSTRACT

A method of communicating in a network having a plurality of nodes including a base node (BN), and a plurality of service nodes (SNs) having at least one switch node (SW) and at least one terminal node (TN). The method includes at least one of a) a first SN from the plurality of SNs receiving (i) a data/ALV_B/ACK frame from the BN or (ii) a beacon from the BN or SW, and restarting a first KA timer at the first SN upon (i) or (ii), and b) restarting an ALV_S timer at the BN for the first SN upon receiving a data/ALV_S/ACK frame from the first SN.

17 Claims, 4 Drawing Sheets

EVENT-BASED KEEP ALIVE TIMES IN COMMUNICATION NETWORKS

CROSS REFERENCE TO RELATED APPLICATIONS

This application and the subject matter disclosed herein claims the benefit of Provisional Application Ser. No. 61/490,187 entitled "OPTIMIZING KEEP ALIVE USAGE IN PRIME" filed May 26, 2011 and Provisional Application Ser. No. 61/605,400 entitled "OPTIMIZING KEEP ALIVE USAGE IN PRIME" filed Mar. 1, 2012, which are herein incorporated by reference in their entirety.

FIELD

Disclosed embodiments relate generally to the field of communications, and, more specifically, methods of node availability in communication networks.

BACKGROUND

Smart grid technology refers to ongoing improvements for the transmission and distribution of electricity from points of generation to consumers. A key component in a smart grid network is the so-called "smart-metering" network. In a typical smart-metering network, electricity (or other utility) meters located at a residency or other edifice are able to transmit the real-time meter readings through powerlines back to the power concentrators and provide valuable real-time electricity control and billing information for the electricity provider.

Due to power efficiency considerations and severe noise in powerlines, direct transmission of metering information through power lines has limited scopes. Therefore, a typical smart metering network has a tree-like topology, including: 1) a data concentrator that serves as the root node in the tree (also called a base node, BN); 2) metering devices at terminal nodes (TNs) in the tree which send their metering readings back to the BN; and 3) switching nodes (SWs) which act as the branch nodes in the tree. The SWs relay the data traffic to the further hops for communication pairs (e.g., a TN and a BN) beyond the direct communication reach. The SWs and TNs in the network are collectively referred to herein as service nodes (SNs).

Powerline-Related Intelligent Metering Evolution (PRIME) is a European standard of smart-metering network. The PRIME standard defines lower layers of a powerline communication narrowband data transmission system for the electric power grid using Orthogonal Frequency-Division Multiplexing (OFDM) in the 42-90 kHz band. A PRIME network utilizes a tree-like topology as described above. In a PRIME network, the Media Access Control (MAC) function enables the BN, as well as the SWs to send out beacons periodically. The beacons also help all the SNs in the network synchronize their clocks and virtually chop the time domain into discrete time frames.

A Keep Alive (KA) procedure is used to detect whether the BN and SNs are alive. KA frames allow the BN to detect when a SN becomes unreachable due to changes in network configuration/topology (bad link, channel conditions, load variations, SN leaving the subnetwork, etc.), or fatal errors at the SN it cannot recover from.

Conventional KA procedures require the BN to send KA request frames (referred to as ALV_B) to each of the SNs in the network and look for KA response frames from the SNs (referred to as ALV_S). However, when the network size increases by adding several SNs, the KA traffic causes network stability issues as depicted in the communications network 100 shown in FIG. 1 which shows a BN 110 communicating with 3 terminal Nodes (TNs) shown as TN1, TN2, and TN3 through a SW shown as SW1. The high traffic depicted can happen especially when the network traffic is already high, such as due to a firmware upgrade.

During high traffic conditions it may become difficult to guarantee end-to-end delivery of KA messages because the network congestion increases due to added data traffic. For example, in networks such as in a PRIME compliant network, Loss of KA messages can lead to unintended node deregistration from the network.

SUMMARY

Disclosed embodiments include methods of Keep Alive (KA) loss reduction in communication networks implemented by new algorithms which reduce network traffic by event-based restarting of KA timers in the network which functions to add time to the KA timers. Extending the time of the KA timers has been found to result in a significant reduction in the number of KA frames transmitted.

One embodiment comprises a method of communicating in a network having a plurality of nodes including a base node (BN), and a plurality of service nodes (SNs). As used herein, SNs can be either switch nodes (SWs) or terminal nodes (TNs). The network includes at least one SW and at least one TN. A first SN (i) receives a data/ALV_B/ACK frame from the BN or (ii) receives a beacon from the BN or SW. A first KA timer at the first SN node is restarted upon (i) or (ii). An ALV_S KA timer for the first SN at the BN can also be restarted upon receiving a data/ALV_S/ACK frame from the first SN.

Also disclosed are modems comprising a processor communicably coupled to a non-transitory memory having stored instructions for implementing a disclosed KA loss reduction algorithm. Communications devices comprising a disclosed modem and a transceiver are also disclosed.

BRIEF DESCRIPTION OF THE DRAWINGS

Reference will now be made to the accompanying drawings, which are not necessarily drawn to scale, wherein.

DETAILED DESCRIPTION

Disclosed embodiments now will be described more fully hereinafter with reference to the accompanying drawings.

Such embodiments may, however, be embodied in many different forms and should not be construed as limited to the embodiments set forth herein. Rather, these embodiments are provided so that this disclosure will be thorough and complete, and will fully convey the scope of this disclosure to those having ordinary skill in the art. One having ordinary skill in the art may be able to use the various disclosed embodiments and there equivalents. As used herein, the term "couple" or "couples" unless clarified, such as in "communicably coupled", is intended to mean either an indirect or direct electrical connection. Thus, if a first device couples to a second device, that connection may be through a direct electrical connection, or through an indirect electrical connection via other devices and connections.

Figure 1:
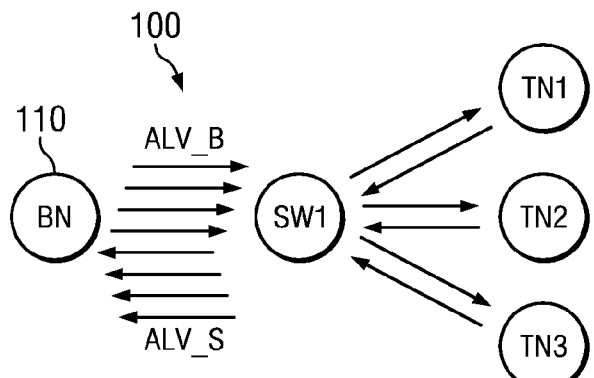
FIG. 1 shows a communications network having a BN communicating with TNs shown as TN1, TN2, and TN3 through a SW shown as SW1 communicating KA messages during a high traffic condition.
Figure 2:
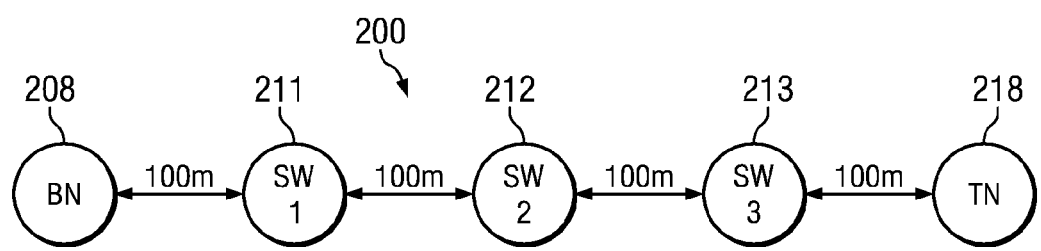
FIG. 2 shows the network setup used to run simulations to quantify KA losses.

FIG. 2 shows the network setup 200 used to run simulations disclosed herein which quantify KA message losses using the known PRIME KA process, which unlike disclosed embodiments, does not consider the network traffic to obtain information about the availability of the nodes in the network to restart KA timers in the network. Restarting KA timers as used herein applied to disclosed embodiments refers to adding time to a KA timer at nodes in the network upon the occurrence of an event that results in delaying a timeout condition, which reduces the incidence of unintended node deregistration from the network.

Five nodes, comprising BN 208, SW 211, SW 212, SW 213 and a TM 218 were positioned along a line as shown in FIG. 2 to provide a 4-level network having a distance of 100 m (meters) between the respective nodes. A Poisson distributing data traffic with a mean inter arrival time of 0.05 s and 73 byte frames that simulates a firmware upgrade scenario (based on lab measurements) was considered for the simulation. The following were the simulation parameters used:

MCS_SCHEME=0 (BPSK_FEC)
MacMaxReTxTimer=15.0 seconds
MacMaxCtrlReTx=3
macSCPMaxTxAttempts=7
macFrameLength=276 (symbols)
macBeaconLength=5 (symbols)
macSCPLength=251 (symbols)
symbolTime=0.00224 (seconds)
preambleTime=0.002048 (seconds)
csmaSenseDelay=0.004096 (seconds)
ALV_TIMER_INTERVAL=16.0 (seconds)
NUM_WAIT_BEACON_FOR_REG=3
TIME_WAIT_FOR_SEND_PNPDU=5.0 (seconds)
TIME_RETRY_REG_AFTER_FAIL=10.0 (seconds)

The node transmission range was set to 150 m causing two-hop distance nodes (at 200 m) and more distant nodes to be hidden from each other to obtain an upper bound on the collision rates (=ALV/DATA loss rate). The collision rate was compared against the scenario where the transmission range was set to 250 m reported as lower bound below for the ALV/DATA loss rate. The lower bound and upper bound simulation results are shown in Table 1 below:

TABLE 1

Alive and Data Loss rate for a 4-level network

|  | ALV/DATA Loss Rate (Lower Bound) | ALV/DATA Loss Rate (Upper Bound) |
| --- | --- | --- |
| 0-level | 9.5%/17.6% (1 baby node) | 9.5%/17.6% (1 baby node) |
| 1-level | 23.2%/15.4% (1 baby node) | 29.5%/42.4% (1 baby node) |
| 2-level | 30.4%/33.2% (1 baby node) | 46.0%/50.4% (1 baby node) |
| 3-level | 37.2%/44.1% (1 baby node) | 43.3%/48.5% (1 baby node) |

It can be observed from Table 1 that the KA message loss rate increases up to 35-40% for the four level network considered due to collisions due resulting from network congestion. This leads to unnecessary (undesired) node deregistration despite the network topology not having changed. Whenever a node in the network deregisters and then reregisters, re-registration causes additional network registration traffic and reestablishment of connection. Such unnecessary deregistration can be avoided by using disclosed KA messaging methods which can use the network traffic to obtain information about the availability of the nodes.

In disclosed methods, the BN maintains two separate KA timers, an ALV_B timer and an ALV_S timer. The ALV_B timer monitors when the last ALV_B/Data/ACK frame was sent to each of the SNs in the network, and the ALV_S timer monitors the incoming Data/ACK/ALV_S frames from the SNs in the network. The SNs in the network also each have a KA timer. The BN decides the KA timeout value (KA_TO value) for itself and nodes in the network using some implementation specific algorithm. The KA_TO value can be communicated by the BN to the SNs using a ALV.TIME field in an ALV_B frame.

The BN sends a given number of ALV_B/Data frames (as defined by the particular implementation) to the SNs in the network every KA_TO interval, such as 3 in one particular implementation. If the processor at the BN recognizes that it has not sent sufficient ALV_B or data frames to a particular SN, the BN triggers the transmission of ALV_B frames to that SN. The BN restarts its ALV_S timer for a given SN every time it receives a data/ACK/ALV_S frame from that SN. If the BN does not receive a ALV_S/data/ACK frame from a SN for an ALV timeout interval, the ALV_S timer expires and the BN can consider the SN to be disconnected, and thus can deregister the SN from the network.

The SWs restart their KA timers for the SWs below it in the network tree in its switch node table every time the SW receives a data/ACK/ALV_S frame the SW. The SNs can restart their KA timers for the BN every time the SN receives a data frame/ACK/ALV_B from the BN. Also, the SN can reply with a ALV_S to an incoming ALV_B from the BN as specified in the current standard. The SNs can also restart their KA timers upon receiving a beacon from the SW or BN.

In one embodiment, the KA timer for SNs in the network referred to herein as a "first SN node" for clarity is restarted to a KA timeout (KA_TO) value when the first SN receives (i) a data/ALV_B/ACK frame from the BN or (ii) a beacon from the BN or SW. The ALV_S KA timer at the BN for the first SN can also be restarted an upon receiving a data/ALV_S/ACK frame from the first SN. The first SN can maintain its last received KA_TO value from either a ALV.TIME field (from an ALV_B frame) or a REG.TIME field (REG is performed when a node joins the network) in LIFE_EXTN_TIME (as a life extension time) for use in computing their current KA_TO value. ALV.TIME and REG.TIME refers to the time field in respective packets.

The current KA_TO value on the KA timer at the SN can also be extended (i.e., restarted at the moment data is received) by KA_TO (ALV.TIME) upon reception of an ALV_B frame from the BN, and can be extended by LIFE_EXTN_TIME upon reception of a data/ACK frame from the BN. This LIFE_EXTN_TIME may also be set as a constant value or set by a REG.TIME field received during the registration (REG) process from the BN. The activities of the respective BN, SW and TN can be as follows:

1. BN: Restarts its ALV_S timer for a given SN every time it receives a data/ACK/ALV-S frame from the SN. Additionally, as noted above, the BN also maintains a ALV-B timer for the SNs to determine when it last sent a ALV_B/Data frame to the respective SNs. If the ALV-B timer expires for any SN, the BN will send a ALV_B message to the SN.

2. SW: Restarts its KA timer for the SWs nodes that are below it in the network tree every time it gets a data frame from theses SWs. In PRIME for example, the KA timer for the SW is for SWs that are below the SW in the tree.

3. SN (TN or SW): Restarts its KA timer for the BN every time it gets a data frame from the BN or Beacons from its SW. The SN will maintain a timer for its BN (a service node is connected to only 1 BN). However, as noted above SWs (which are also SNs) will maintain timers for all SWs below them. Beacons received from the SWs or BN can also gives a good indication of the network stability and thus can be used to restart KA timers at the SNs.

Figure 3:
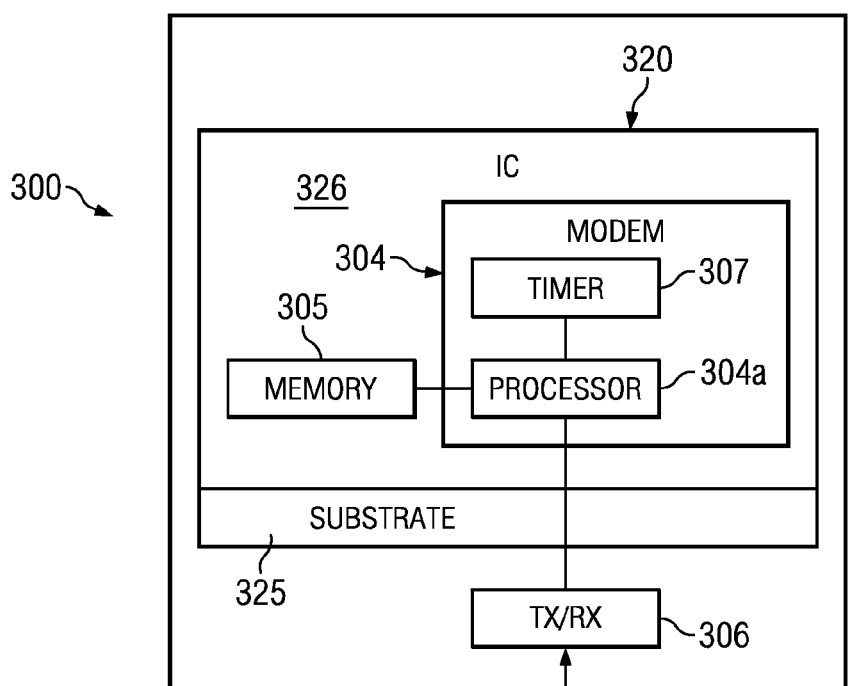
FIG. 3 shows a block diagram schematic of a communication device having a disclosed processor which implements a disclosed KA message loss reduction algorithm, according to an example embodiment.

FIG. 3 shows a block diagram schematic of a communications device 300 comprising a modem 304 including a processor (e.g., a digital signal processor, (DSP)) 304a having associated non-transitory memory 305 that implements a disclosed KA loss reduction algorithm, according to an example embodiment. Modem 304 includes at least one KA timer shown as timer 407. In the case of the communications device 300 used as a SN, the SN has a timer referred to herein as a first KA timer.

When the communications device 300 is used as a BN, the BN maintains two KA timers, so that timer 407 includes an ALV_B timer and an ALV_S timer. As disclosed above, the KA loss reduction algorithm uses at least one of a) (i) receipt of a data/ALV_B/ACK frame from the BN or (ii) receipt of a beacon from the BN or a SW in the network and restarts the first KA timer at the first SN upon (i) or (ii), and b) restarts the ALV_S timer at the BN for the first SN upon receiving a data/ALV_S/ACK frame from the first SN.

The modem 304 is shown formed on an integrated circuit (IC) 320 comprising a substrate 325 having a semiconductor surface 326, such as a silicon surface. In another embodiment the modem 304 is implemented using 2 processor chips, such as 2 DSP chips. Communications device 300 also includes an analog from end (AFE) shown as a transceiver (TX/RX) 306 that allows coupling of the communications device 300 to the communications media 340, such as a powerline for powerline communications or the air for wireless communications, to facilitate communications with SNs in the network. For wireless applications, transceiver 306 comprises a wireless transceiver that is coupled to an antenna (not shown). In one embodiment the transceiver 306 comprises an IC separate from IC 320. Besides the DSP noted above, the processor 304a can comprise a desktop computer, laptop computer, cellular phone, smart phone, or an application specific integrated circuit (ASIC).

Figure 4:
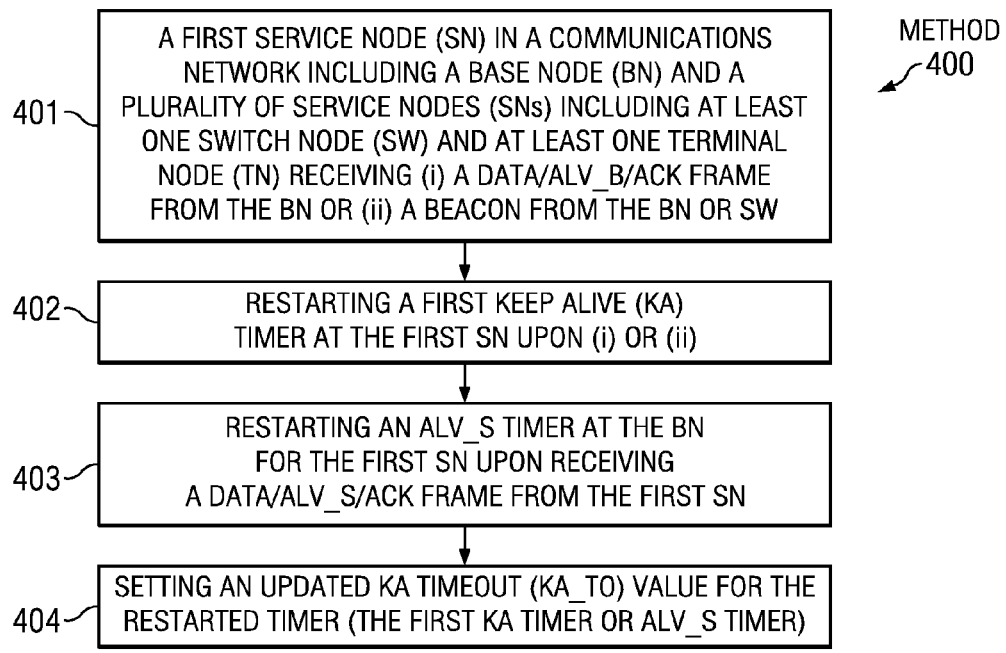
FIG. 4 is a flowchart for a method of communicating using an example KA message loss reduction algorithm, according to an example embodiment.

FIG. 4 is a flowchart for a method 400 of communicating using an example KA message loss reduction algorithm, according to an example embodiment. The network has a plurality of nodes including a BN, and a plurality of SNs having at least one SW and at least one TN. Step 401 comprises a first SN receiving (i) a data/ALV_B/ACK frame from the BN or (ii) a beacon from the BN or SW. Step 402 comprises restarting a first KA timer at the first SN upon (i) or (ii). Step 403 comprises restarting an ALV_S timer at the BN for the first SN upon receiving a data/ALV_S/ACK frame from the first SN. Step 404 comprises setting an updated KA timeout (KA_TO) value for the restarted timer (first KA timer or ALV_S timer). As noted above, the updated KA_TO value can be based on time information in a ALV.TIME field received, or can be stored at the first SN.

EXAMPLES

Disclosed embodiments are further illustrated by the following specific Examples, which should not be construed as limiting the scope or content of this Disclosure in any way.

Simulation results were generated to compare results from a disclosed KA message loss reduction algorithm applied to a powerline communications network vs. the same powerline comminations network using a known KA algorithm. The topology used for this simulation was different as compared to the topology described above regarding network setup 200. The topology described in this Example is believed to better represent a powerline communications network application and the parameters of interest.

Powerline communications are typically used in meter read applications. In meter read applications the BN sends a data request to each SN in the network and the respective SNs respond with the requested data. To emulate this application, the following application was used.

1. The BN sends a 90 byte data to each SN and waits for a response for a data retry time out.
2. The SNs respond with a 90 byte data frame on receipt of the request frame.
3. If the BN timesout, the BN will retry the meter read for up to 5 times.
4. The meter read application is started 3000 s after the start of the simulation.
5. The total simulation time is set to 15000 s.

To perform a fair comparison the number of ALV_B frames sent by the BN using a disclosed KA message loss reduction algorithm was kept the same as that of the known KA algorithm when there is no data traffic. During data traffic, the disclosed KA message loss reduction algorithm uses the occurrence of network events including data traffic and beacons to reduce the KA traffic thus significantly improving network performance.

Figure 5B:
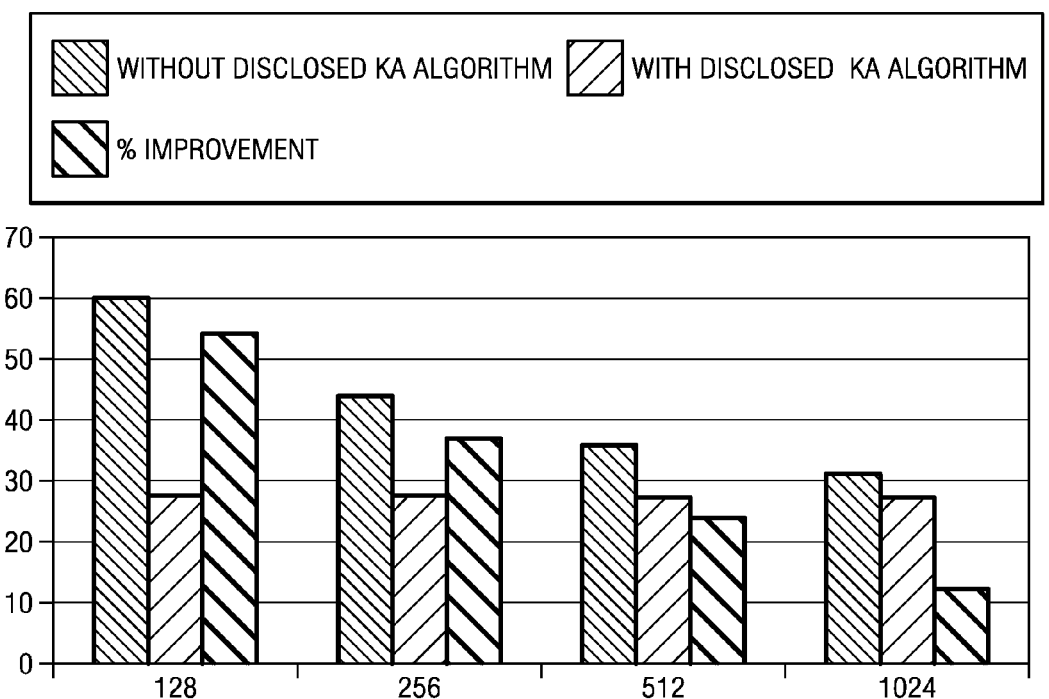
FIG. 5B shows simulated data for meter read cycle delay across different KA timeout values.
Figure 5A:
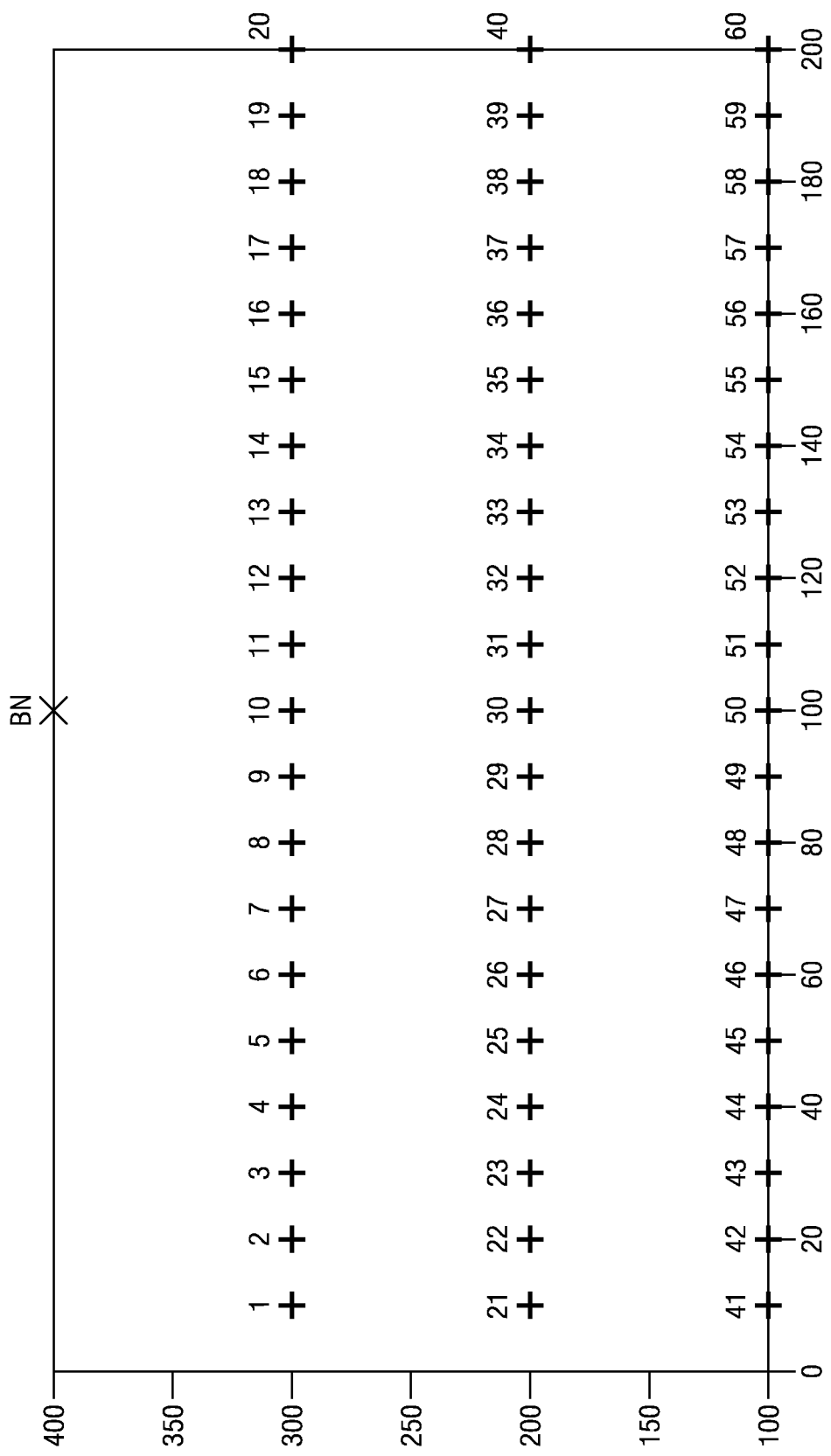
FIG. 5A shows a 60 node 3 level topology used for the simulation described in the Examples section.

FIG. 5A shows the 60 node 3 level topology used for the simulation. Each of the 3 levels had 20 nodes. The axes are distance in meters. All nodes in one level were assumed to sense the transmissions from all nodes in adjoining levels. Levels are shown separated by 100 meters.

TABLE 2

Meter read cycle delay across different KA time values (this data is also plotted in FIG. 5B)

| KA_TO | Without disclosed KA algorithm | With disclosed KA algorithm | % improvement |
|---|---|---|---|
| 128 | 60.311308 | 27.54011 | 54.33673897 |
| 256 | 43.844522 | 27.562919 | 37.13486259 |
| 512 | 35.950643 | 27.370423 | 23.86666631 |
| 1024 | 31.251614 | 27.373328 | 12.40987425 |

TABLE 3

Figure 5C:
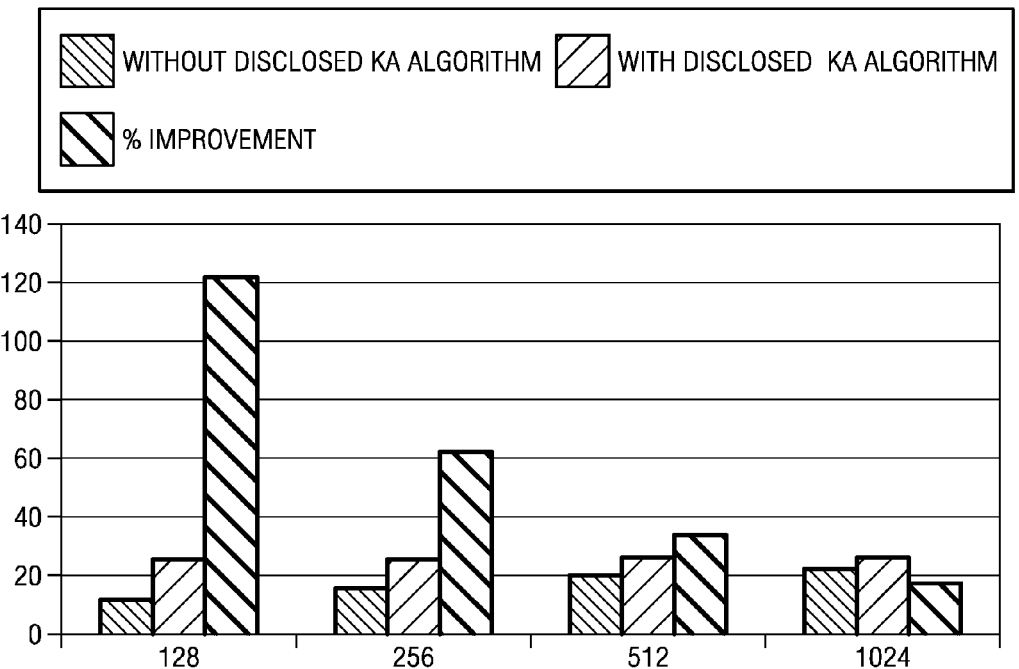
FIG. 5C shows simulated data for the total successful meter read in thousands across some example KA timeout values.

Total successful meter reads across KA time values (this data is also plotted in FIG. 5C)

| KA_TO | Without disclosed KA algorithm | With disclosed KA algorithm | % improvement |
|---|---|---|---|
| 128 | 11764 | 26084 | 121.7273036 |
| 256 | 16030 | 26062 | 62.58265752 |
| 512 | 19578 | 26246 | 34.05863725 |
| 1024 | 22320 | 26243 | 17.57616487 |

TABLE 4

Figure 5D:
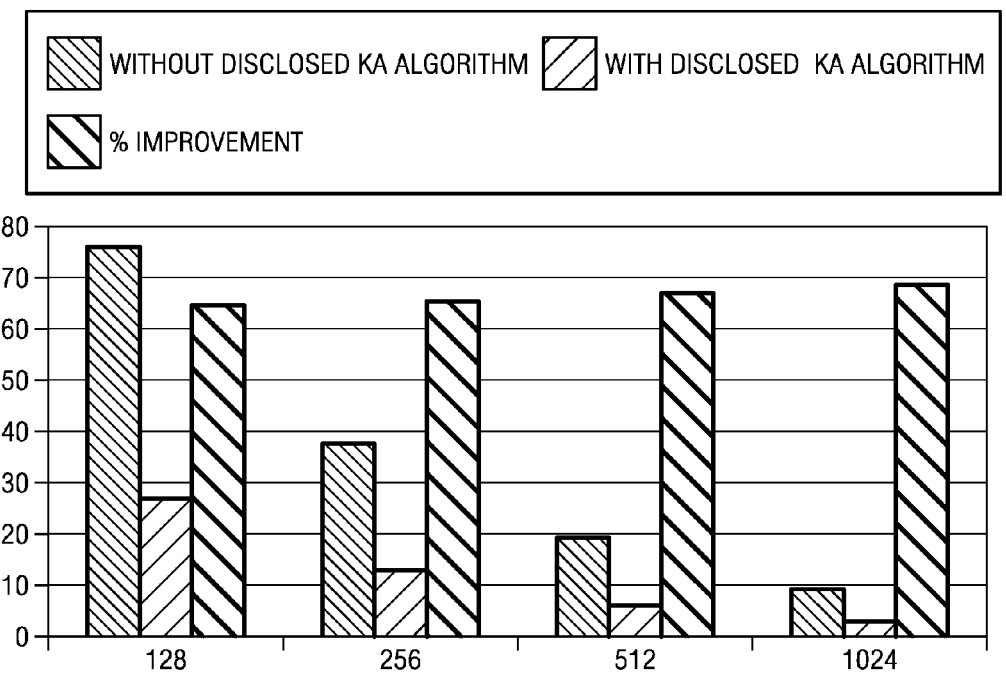
FIG. 5D shows simulated data for the Total ALV frames sent by BN in hundreds across example KA timeout values.

Total ALV frames sent by BN across KA time values
(this data is also plotted in FIG. 5D)

| KA_TO | Without disclosed KA algorithm | With disclosed KA algorithm | % improvement |
|---|---|---|---|
| 128 | 7608 | 2687 | 64.68191377 |
| 256 | 3777 | 1299 | 65.6076251 |
| 512 | 1935 | 638 | 67.02842377 |
| 1024 | 955 | 300 | 68.58638743 |

From the data provided in this Example it can be observed that the meter read delay was reduced by up to 55% and the number of meter reads is increased by up to 120% by the use of a disclosed KA algorithm. This improvement is achieved because of the reduced network traffic caused by reduced KA frames. The total KA frames sent by the BN to the SNs was reduced by up to 68% by the use of the disclosed KA algorithm.

Many modifications and other embodiments of the invention will come to mind to one skilled in the art to which this Disclosure pertains having the benefit of the teachings presented in the foregoing descriptions, and the associated drawings. Therefore, it is to be understood that embodiments of the invention are not to be limited to the specific embodiments disclosed. Although specific terms are employed herein, they are used in a generic and descriptive sense only and not for purposes of limitation.

We claim:

1. A method of communicating in a network having a plurality of nodes including a base node (BN) and a plurality of service nodes (SNs) including at least one switch node (SW) and at least one terminal node (TN), comprising:
   restarting an ALV_S timer at said BN for said first SN upon receiving a data/ALV_S/ACK frame from said first SN;
   setting a Keep Alive KA timeout (KA_TO) value for said first KA timer by transmitting an Alive ALV.TIME field in an ALV_B frame, wherein said KA_TO value is set by said BN using an implementation specific algorithm, and wherein said BN uses an ALV_B timer to track a last sent data frame or said ALV_B frame to said first SN to ensure said BN sends at least some frames to said first SN during each time interval defined by said KA_TO value.

2. The method of claim 1, wherein said network utilizes Orthogonal Frequency-Division Multiplexing (OFDM) signaling.

3. The method of claim 1, wherein said communications comprise powerline communications.

4. The method of claim 1, wherein said communications comprise wireless communications.

5. A method of communicating in a network having a plurality of nodes including a base node (BN) and a plurality of service nodes (SNs) including at least one switch node (SW) and at least one terminal node (TN), comprising:
   a first SN from said plurality of SNs receiving (i) a data /ALV_B/ACK frame from said BN or (ii) a beacon from said BN or said SW and restarting a first Keep Alive (KA) timer at said first SN node upon said (i) or said (ii); and
   setting a KA timeout (KA_TO) value for said first KA timer by transmitting an Alive ALV.TIME field in an ALV_B frame, wherein said KA_TO value is set by said BN using an implementation specific algorithm, and wherein said BN uses an ALV_B timer to track a last sent data frame or said ALV_B frame to said first SN to ensure said BN sends at least some frames to said first SN during each time interval defined by said KA_TO value.

6. The method of claim 5, wherein said communications comprise powerline communications.

7. The method of claim 5, wherein said communications comprise wireless communications.

8. A method of communicating in a network having a plurality of nodes including a base node (BN) and a plurality of service nodes (SNs) including at least one switch node (SW) and at least one terminal node (TN), comprising:
   a first SN from said plurality of SNs receiving (i) a data /ALV_B/ACK frame from said BN or (ii) a beacon from said BN or said SW and restarting a first Keep Alive (KA) timer at said first SN node upon said (i) or said (ii); and
   restarting an Alive ALV_S timer at said BN for said first SN upon receiving a data/ ALV_S/ACK frame from said first SN; and
   setting a KA timeout (KA_TO) value for said first KA timer by transmitting an ALV.TIME field in an ALV_B frame, wherein said KA_TO value is set by said BN using an implementation specific algorithm, and wherein said BN uses an ALV_B timer to track a last sent data frame or said ALV_B frame to said first SN to ensure said BN sends at least some frames to said first SN during each time interval defined by said KA_TO value.

9. The method of claim 5, wherein said network utilizes Orthogonal Frequency-Division Multiplexing (OFDM) signaling.

10. A modem, comprising:
    a processor implementing a Keep Alive (KA) timer communicably coupled to a non-transitory memory having stored instructions for implementing a KA loss reduction algorithm at a first node in a network having a plurality of nodes including a base node (BN), and a plurality of service nodes (SNs) having at least one switch node (SW) and at least one terminal node (TN), that, when executed, cause said processor to:
    when said modem is at a first SN from said plurality of SNs, restarting a first Keep Alive (KA) timer at said first SN node upon said first SN node receiving (i) a data /ALV_B/ACK frame from said BN or (ii) a beacon from said BN or said SW and
    when said modem is at said BN, restarting an ALV_S timer at said BN for said first SN upon receiving a data/ ALV_S/ACK frame from said first SN; and
    setting a KA timeout (KA_TO) value for said first KA timer by transmitting an ALV.TIME field in an ALV_B frame, wherein said KA_TO value is set by said BN using an implementation specific algorithm, and wherein said BN uses an ALV_B timer to track a last sent data frame or said ALV_B frame to said first SN to ensure said BN sends at least some frames to said first SN during each time interval defined by said KA_TO value.

11. The modem of claim 10, wherein said modem is formed on an integrated circuit (IC) comprising a substrate having a semiconductor surface, and wherein said processor comprises a digital signal processor (DSP).

12. The modem of claim 10, wherein said modem comprises a powerline modem.

13. The modem of claim 10, wherein said modem comprises a wireless modem.

14. A communications device, comprising:

a modem, comprising:

a processor implementing a Keep Alive (KA) timer communicably coupled to a non-transitory memory having stored instructions for implementing a KA loss reduction algorithm at a first node in a network having a plurality of nodes including a base node (BN), and a plurality of service nodes (SNs) having at least one switch node (SW) and at least one terminal node (TN), that, when executed, cause said processor to:

when said modem is at a first SN from said plurality of SNs, restarting a first Keep Alive (KA) timer at said first SN node upon said first SN node receiving (i) a data /ALV_B/ACK frame from said BN or (ii) a beacon from said BN or said SW and when said modem is at said BN, restarting an ALV_S timer at said BN for said first SN upon receiving a data/ ALV_S/ACK frame from said first SN;

setting a KA timeout (KA_TO) value for said first KA timer by transmitting an ALV.TIME field in an ALV_B frame, wherein said KA_TO value is set by said BN using an implementation specific algorithm, and wherein said BN uses an ALV_B timer to track a last sent data frame or said ALV_B frame to said first SN to ensure said BN sends at least some frames to said first SN during each time interval defined by said KA_TO value; and a transceiver communicably coupled to said modem.

15. The communications device of claim 14, wherein said modem and said non-transitory memory are formed on an integrated circuit (IC) comprising a substrate having a semiconductor surface, and wherein said processor comprises a digital signal processor (DSP).

16. The communications device of claim 14, wherein said modem comprises a powerline modem and said transceiver comprises a powerline transceiver.

17. The communications device of claim 14, wherein said modem comprises a wireless modem and said transceiver comprises a wireless.

* * * * *